C. C. BRADLEY.

HARVESTERS.

No. 7,831. Reissued Aug. 7, 1877.

Attests:

J. Bonsall Taylor

O. B. Morris

Inventor

Christopher C. Bradley by atty: W. C. Thawbridge

UNITED STATES PATENT OFFICE.

CHRISTOPHER C. BRADLEY, OF SYRACUSE, NEW YORK.

IMPROVEMENT IN HARVESTERS.

Specification forming part of Letters Patent No. 177,680, dated May 23, 1876; Reissue No. 7,831, dated August 7, 1877; application filed July 26, 1877.

*To all whom it may concern:*

Be it known that I, CHRISTOPHER C. BRADLEY, of Syracuse, New York, have invented a new and useful Improvement is Harvesters, of which the following is a specification:

My invention relates to the pitmen of mowing and reaping machines; and consists of the adjustable elastic self-oiling ball-and-socket connection between the pitman and the cutter-bar, hereinafter described.

Similar letters of reference indicate corresponding parts in all the drawings, of which—

Figure 1:
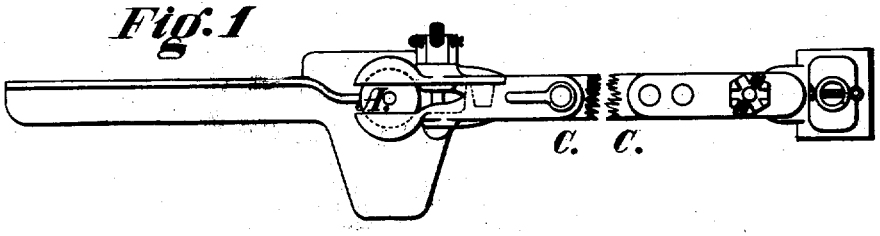
Figure 2:
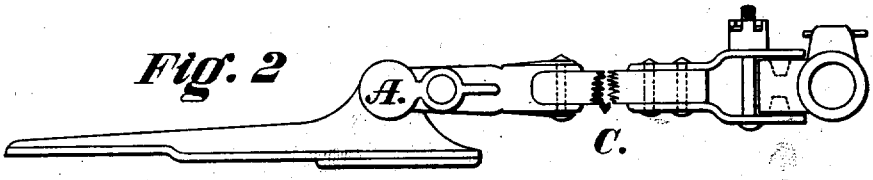
Figure 3:
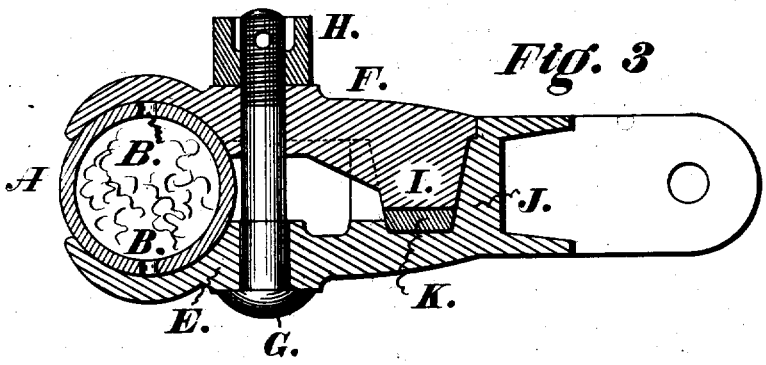
Figure 4:
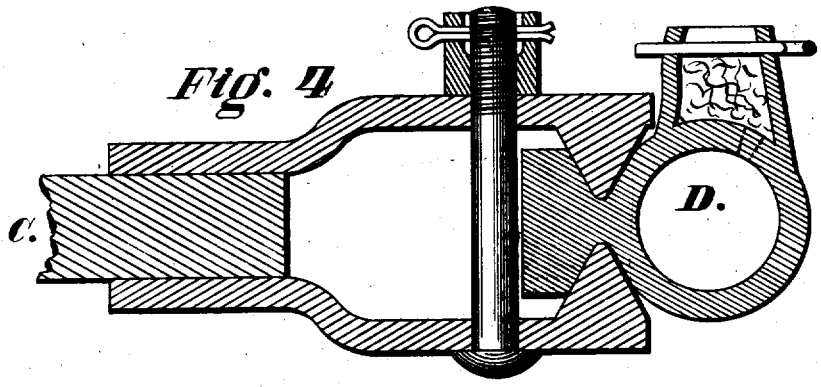

Figure 1 is a top view; Fig. 2, a side elevation of my improved device; Fig. 3, a horizontal section of my improved ball-and-socket connection, and Fig. 4 a vertical section of a suitable pivoted journal-box for the driving-crank.

In the drawing, A represents a hollow spherical cutter-bar head, filled in completely with fibrous or other absorbent material to retain lubricating matter. It is perforated laterally with two holes, B B, through which the lubricant escapes to oil the clasps, and has an opening on its upper surface, through which it is supplied. C is the pitman-bar, connected to the driving-crank by any suitable pivoted journal-box, such as that shown and lettered D. E and F are two socket-clasps, grasping the cutter-bar head upon both sides, E attached rigidly to the opposite extremity of the pitman-bar from that connected with the crank, and F removably secured by means of a bolt and lock-nut, G and H, passing through and connecting both clasps, and held in position by a conical stud, I, taking into a correspondingly-shaped recess, J, formed in the clasp E. K is a piece of rubber or other elastic material, placed in the recess J for the stud to press upon, whereby a certain elasticity of compression is imparted to the socket-clasp.

The joint is entirely self-oiling, can be readily adjusted in tension, while all slack can be easily taken up; is simple, elastic in its action, will not become loose or irregular, and secures, in connection with the pivoted journal-box, a perfectly free action to the pitman.

It will also be readily understood that my spherical cutter-bar head not only enables a self-oiling pitman and cutter-bar connection to be provided, but this construction also provides a cutter-bar head of minimum weight without decrease of strength and efficiency, and prevents the shrinkage of the malleable iron or steel in the process of forming or casting the same. The shrinkage of the ordinary solid head being very considerable in the process of forming the same, the great advantage of a cutter-bar head of my construction is apparent.

The clasps and head may be made of any desired anti-friction metal.

Having thus described my invention, I claim and desire to secure by Letters Patent of the United States—

1. In a harvester, a spherical cutter-bar head, cast or formed hollow, for the purposes specified.

2. In a harvester, a hollow spherical cutter-bar head, to contain lubricating material, substantially as described.

3. In a harvester-pitman, the combination of a detached socket-clasp, F, a fixed socket-clasp, E, a bolt and lock-nut, G, and an elastic cushion, K, the whole forming an elastic socket-joint, as shown and described, and for the purpose specified.

CHRISTOPHER C. BRADLEY.

Witnesses:
OWEN DARCY,
JOHN JOLLEY, Jr.